United States Patent [19]

Kikuchi et al.

[11] Patent Number: 5,158,674
[45] Date of Patent: Oct. 27, 1992

[54] RADIOACTIVE WASTE LIQUID TREATMENT APPARATUS

[76] Inventors: Makoto Kikuchi, 1-1 Mikanoharacho-2-chome, Hitachi-shi; Shin Tamata, 2899-19, Isohamacho, Oaraimachi, Higashiibaraki-gun, Ibaraki-ken; Masato Ohura, 5-4-405, Nishinarusawacho-1-chome; Toshio Sawa, 11-3, Mikanoharacho-2-chome, both of Hitachi-shi, all of Japan

[21] Appl. No.: 625,354

[22] Filed: Dec. 11, 1990

[30] Foreign Application Priority Data

Dec. 15, 1989 [JP] Japan ................. 1-325424

[51] Int. Cl.⁵ .................. B01D 61/36; B01D 61/00
[52] U.S. Cl. ..................... 210/195.2; 210/195.3; 210/275; 210/640; 252/628; 252/629; 252/631
[58] Field of Search ............ 210/640, 634, 644, 108, 210/676, 686, 760, 771, 682, 663, 181, 195.1, 275, 634, 640, 682, 108, 636, 651, 195.2; 252/629, 631, 628

[56] References Cited

U.S. PATENT DOCUMENTS

| | | | |
|---|---|---|---|
| 4,313,832 | 2/1982 | Shimizu et al. | 210/663 |
| 4,528,011 | 7/1985 | Macedo et al. | 252/631 |
| 4,544,499 | 10/1985 | Tran et al. | 252/631 |
| 4,622,176 | 11/1986 | Motoki et al. | 252/631 |
| 4,737,316 | 4/1988 | Macedo et al. | 252/629 |
| 4,879,006 | 11/1989 | Turner | 252/631 |

FOREIGN PATENT DOCUMENTS

| | | |
|---|---|---|
| 62-019299 | of 1985 | Japan . |
| 61-164195 | of 1986 | Japan . |
| 61-286798 | of 1986 | Japan . |
| 8806914 | 9/1988 | Japan ................. 210/640 |

*Primary Examiner*—Robert A. Dawson
*Assistant Examiner*—Ana M. Fortuna

[57] ABSTRACT

A radioactive waste liquid treatment apparatus according to the invention comprises an upstream-side filter unit having an inlet for radioactive waste liquid, and a downstream-side filter unit communicating with the upstream-side filter unit and having an outlet for filtrated liquid. Further, the upstream-side filter unit includes first filter member installed therein having active silica for removal of interfacial active agents and oil, whereas the downstream-side filter unit includes second filter member installed therein, and this second filter member has a vapor permeable membrane.

15 Claims, 6 Drawing Sheets

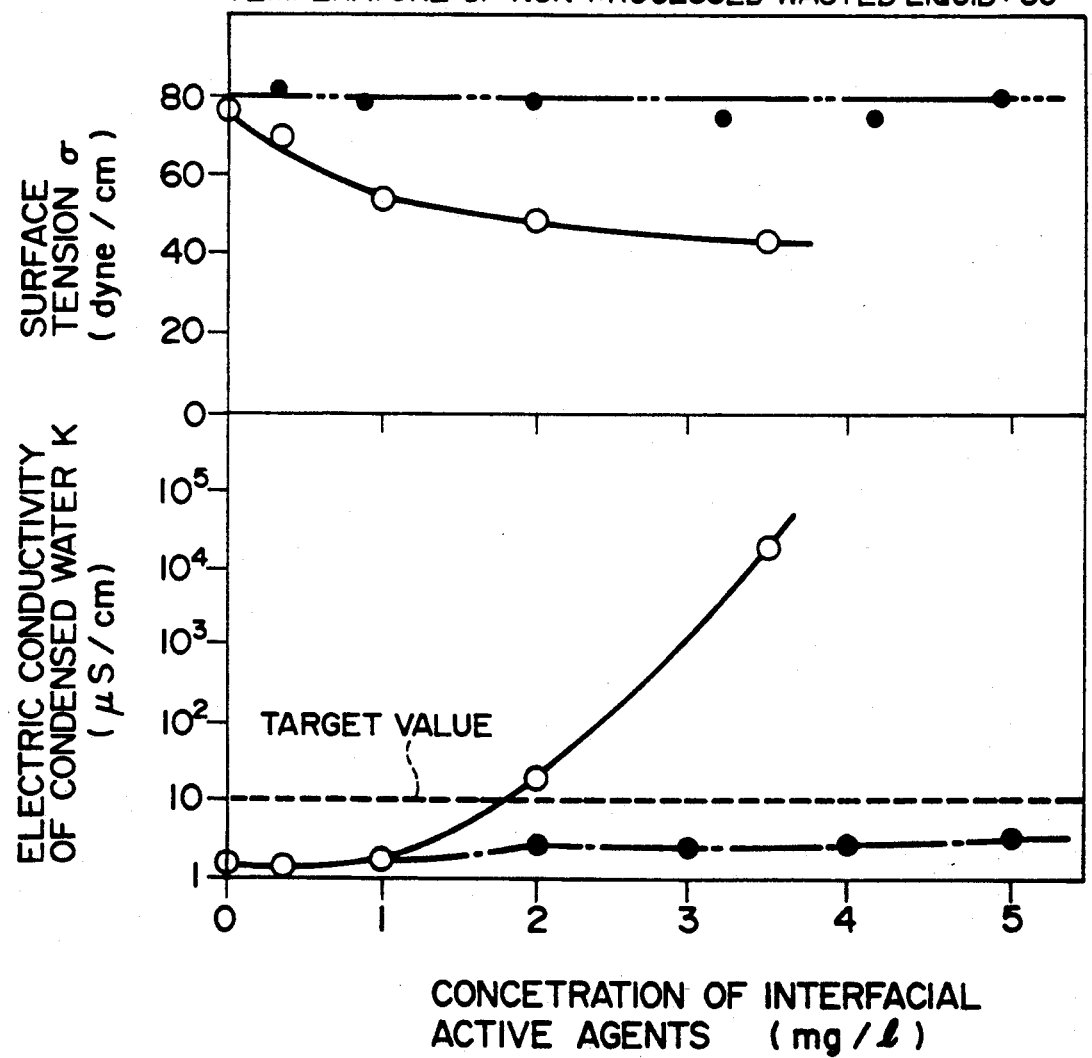

RADIOACTIVE WASTE LIQUID TREATMENT APPARATUS

BACKGROUND OF THE INVENTION

The present invention relates to an apparatus for treatment of radioactive waste liquid generated in a nuclear power plant or the like and, more particularly, to a radioactive waste liquid treatment apparatus of a non-boiling type, i.e., of a membrane-type vaporization/concentration system.

Radioactive waste liquid inevitably produced in a nuclear power plant is an aggregate material consisting of waste liquid produced in regeneration of a demineralizer, floor drain and the like. Such waste liquid includes, as a main component, a large amount of sodium sulfate $Na_2SO_4$ in the case of a BWR (boiling water reactor) plant. In the case of a PWR (pressurized water reactor) plant, the waste liquid includes a large amount of sodium borate $Na_3B_4O_7$, having a high electric conductivity of 5 ms/cm.

A main component of waste liquid produced in a spent fuel reprocessing plant is sodium nitrate $NaNO_3$, its electric conductivity being similarly high.

Since the waste liquid of such a high electric conductivity cannot be directly processed in a demineralizer, the waste liquid is concentrated in a vaporization/concentration apparatus to the extent that $Na_2SO_4$ will be about 25 wt %. Likewise, $Na_3B_4O_7$ will be concentrated to about 12 wt %. On the other hand, vaporized water is condensed and turned into water, however, its electric conductivity is still high. Consequently, the condensed water is further processed in a demineralizer so as to be recycled for makeup water.

In this case, $Na_2SO_4$ as a scale component and chlorine ions as a corrosive component are highly concentrated in the vaporization/concentration apparatus, and therefore, there are taken strong measures against corrosion of structural material of the apparatus. For instance, titanium is used for the structural material. Further concerning corrosion resistance, processing is done under reduced pressure to boil water at a temperature as low as possible, e.g., 65° C. It is also necessary to take such steps as to mix an anticorrosive called "inhibitor" with processing liquid as a pre-processing.

Besides, boiling vaporization in the vaporization/concentration system induces mist to disperse to a large extent and increases a load of the demineralizer which is provided for maintaining purity of the condensed water.

For the reasons, there has been suggested a membrane-type vaporization/concentration system in which a hydrophobic porous membrane is used for a vaporization surface to perform non-boiling vaporization/concentration.

In the membrane-type vaporization/concentration system, as disclosed in Japanese Patent Unexamined Publications Nos. 61-286798, 61-164195 and the like, there is employed a porous membrane of hydrophobic polymer through which water vapor is transferred to a space where it is condensed, whereas the membrane prevents ions and the like in waste liquid from passing therethrough, to thereby concentrate the waste liquid.

However, radioactive waste liquid usually contains detergent drainage or the like including interfacial active agents, and such interfacial active agents degrade the function of the above-mentioned porous membrane. That is, as indicated by a continuous curve line of a graph in FIG. 6, when concentration of interfacial active agents contained in waste liquid is 3.5 mg/l or more, the electric conductivity of condensed water becomes drastically increased. The reason seems to be that hydrophobic property of the membrane is damaged because surface tension of the waste liquid is lowered and because the interfacial active agents are adhered on the membrane, so that the waste liquid in the original state may leak through the membrane.

In addition, radioactive waste liquid usually contains machine oil or the like including oil and solid matter, which also deteriorates the function of the porous membrane.

SUMMARY OF THE INVENTION

The object of the present invention is to provide a radioactive waste liquid treatment apparatus which can prevent deterioration of a vapor permeable membrane in a membrane-type vaporization/concentration apparatus, while reducing the amount of secondary wastes, and which can prevent the operators from being exposed to radioactivity.

The present invention provides a radioactive waste liquid treatment apparatus comprising an upstream-side filter means for filtering having an inlet for radioactive waste liquid, and a downstream-side filter means for filtering communicating with the upstream-side filter means and having an outlet for filtrated liquid, the upstream-side filter means including first filter member installed or accommodated therein having active silica for removal of interfacial active agents and oil, the downstream-side filter means including second filter member installed therein, the second filter member having a vapor permeable membrane.

Moreover, the invention provides a radioactive waste liquid treatment apparatus comprising an upstream-side filter means for filtering having an inlet for radioactive waste liquid, and a downstream-side filter means for filtering communicating with the upstream-side filter means and having an outlet for filtrated liquid, the upstream-side filter means including first filter member installed or accommodated therein for removal of interfacial active agents and oil, the downstream-side filter means including second filter member installed therein, the second filter member having a vapor permeable membrane, and the apparatus further comprising a backwash means for backwashing the first filter member of the upstream-side filter means.

Furthermore, the invention provides a radioactive waste liquid treatment apparatus comprising an upstream-side filter means for filtering having an inlet for radioactive waste liquid, and a downstream-side filter means for filtering communicating with the upstream-side filter means and having an outlet for filtrated liquid, the upstream-side filter means including first filter member installed or accommodated therein having active silica for removal of interfacial active agents and oil, the downstream-side filter means including second filter member installed or accommodated therein, the second filter member having a vapor permeable membrane, and the apparatus further comprising incineration means for incinerating active silica after use in the upstream-side filter means.

BRIEF DESCRIPTION OF THE DRAWINGS

FIG. 6 is a graph illustrative of decrease in purity of recycling water induced by interfacial active agents.

DESCRIPTION OF THE PREFERRED EMBODIMENTS

Figure 1:
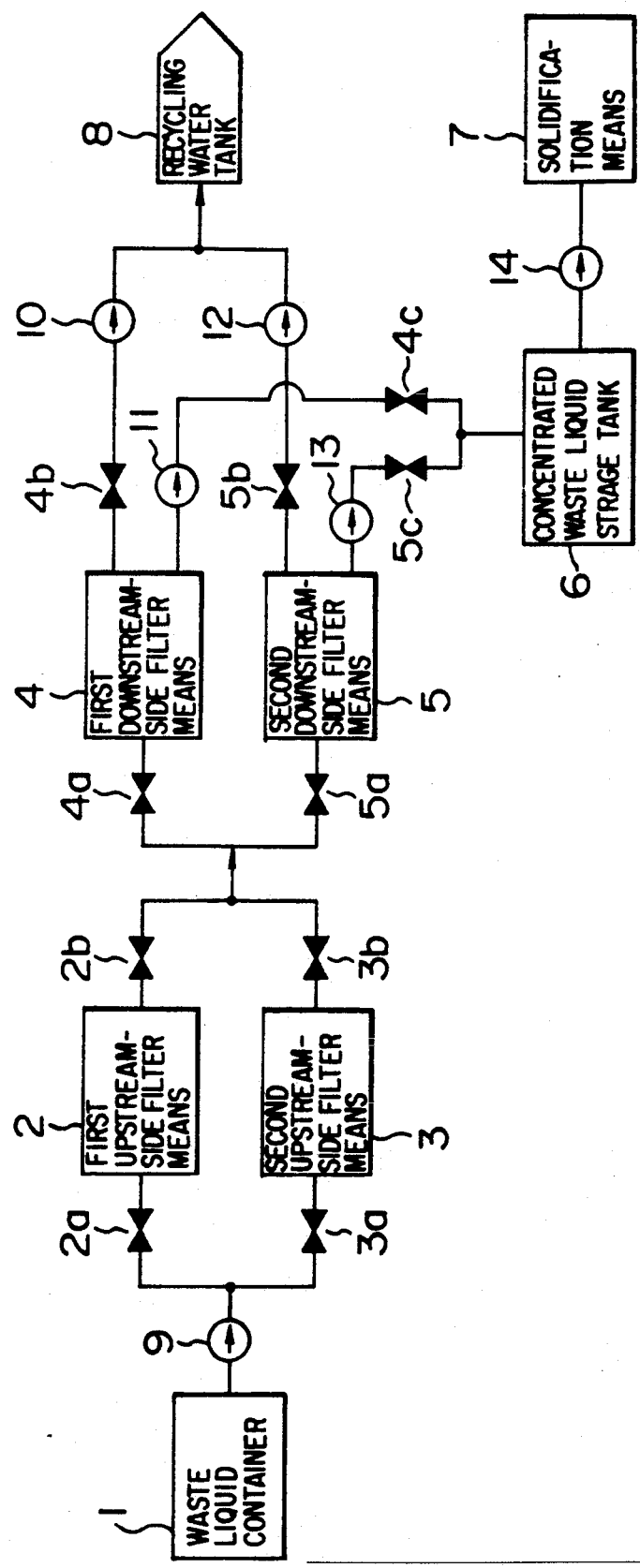
FIG. 1 is a flow chart of a first embodiment according to the present invention.

FIG. 1 is a flow chart showing a first embodiment of a radioactive waste liquid treatment apparatus according to the present invention.

Radioactive waste liquid generated in a nuclear power plant or the like is stored in a waste liquid container 1. This waste liquid container is communicated with an upstream-side filtering system through a pump 9.

The upstream-side filtering system comprises a first upstream-side filter means 2 and a second upstream-side filter means 3 connected in parallel to each other as shown in FIG. 1.

Active silica precoated on filter elements made of cellulose fiber is used for filter members of both upstream-side filter means.

Control valves 2a, 2b and 3a, 3b are provided on inlet and outlet sides of conduits of these upstream-side filter means, respectively.

The above-described upstream-side filtering system is communicated with a downstream-side filtering system which includes a first downstream-side filter means 4 and a second downstream-side filter means 5 connected in parallel to each other.

Control valves 4a, 4b and 5a, 5b are also provided on inlet and outlet sides of conduits of these downstream-side filter member, respectively.

Pumps 10, 12 are respectively attached to the conduits on the outlet sides of the valves 4b, 5b.

The above-described downstream-side filtering system is communicated to a recycling water tank 8 for storage of filtrated water.

Besides, the respective downstream-side filter means 4, 5 of the downstream-side filtering system are communicated with a concentrated waste liquid storage tank 6 through pumps 11, 13 and control valves 4c, 5c, successively.

Further, this waste liquid storage tank 6 is communicated with or leads to a solidification means 7 via a pump 14.

An operating method of the first embodiment of the invention will be described hereinafter.

Radioactive waste liquid containing $Na_2SO_4$, $NaB_4O_7$, $NaNO_3$ or the like which are insoluble components within the waste liquid container 1 is fed to the upstream-side filtering system by means of the pump 9 and, for example, flows into the first upstream-side filter means 2 via the opened valve 2a.

Figure 3A:
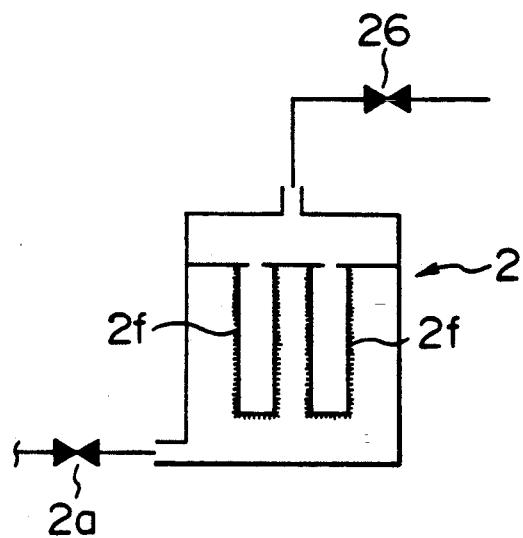
FIG. 3A is a schematic view showing an upstream-side filter means according to the first embodiment of the invention.

Referring to FIG. 3A, the first upstream-side filter means 2 includes an inlet for waste liquid at the lower end portion of a casing thereof, and an outlet at the upper end portion of the same. Filter elements (filter members) precoated with the above-mentioned active silica 2f are accommodated in this first filter unit 2.

With reference to FIG. 1, the above-mentioned interfacial active agents, oil and solid matter which are insoluble components in the radioactive waste liquid are separated from the waste liquid in the first filter means 2.

The waste liquid flowing out of the first filter means 2 is fed into, for example, the first downstream-side filter means 4 through the opened control valve 2b and further through the control valve 4a of the downstream-side filtering system.

Figure 4:
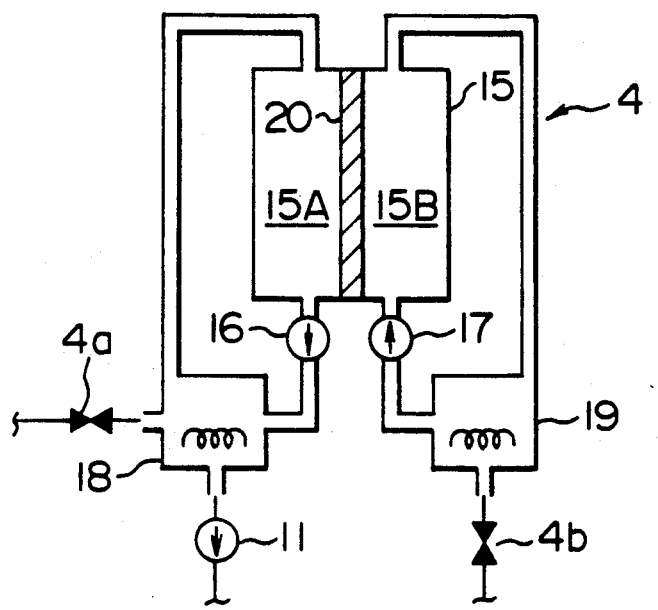
FIG. 4 is a schematic view showing a downstream-side filter means according to the first embodiment of the invention.

In FIG. 4, each of the downstream-side filter means 4, 5 is provided with a concentrator of a vapor filtering membrane type employing a vapor permeable membrane 20 made of Teflon ®, and this concentrator includes a first circulation flow pass for temporarily storing and heating the waste liquid fed from the upstream-side filtering system prior to circulation, and a second circulation flow pass for circulating cooling water so as to cool the water vapor passed through the vapor permeable membrane due to membrane-vaporization function and so as to mix the water vapor with the cooling water for recycling.

Referring again to FIG. 4, after the waste liquid flowing into the first circulation flow pass via the control valve 4a is heated in a heating tank 18 having a heater, the waste liquid flows into one chamber 15a of the concentrator divided by the vapor permeable membrane 20, and then, the waste liquid is returned back to the heating tank 18 by a pump 16 provided on an outlet on the lower side of the chamber 15A.

On the other hand, as for the second circulation flow pass, the cooling water flowing into the other chamber 15B of the concentrator through a pump 17 from a cooling water supply tank 19 cools and condenses the water vapor passed through walls of the vapor permeable membrane 20 from the chamber 15A in order to turn it into a state of water, so that the condensed water is fed out of the chamber 15B together with the cooling water flowing again into the cooling water supply tank 19.

Figure 5A:
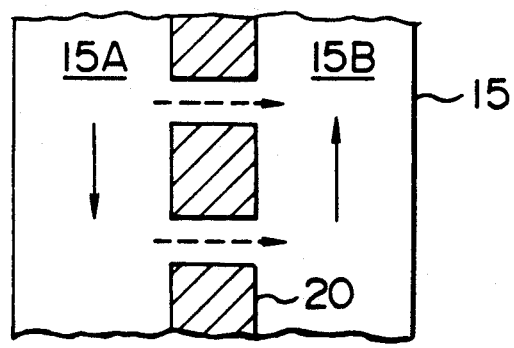
FIG. 5A is a view illustrative of filtration function of the upstream-side filter means according to the first embodiment of the invention when it is in a good condition.

With reference to FIG. 5A, the vapor permeable membrane has such function that the heated waste liquid flowing into the chamber 15A is brought into contact with the wall of the vapor permeable membrane 20, and that only water vapor (shown by the dotted lines) in the waste liquid is passed through the membrane 20 into the chamber 15B.

Figure 5B:
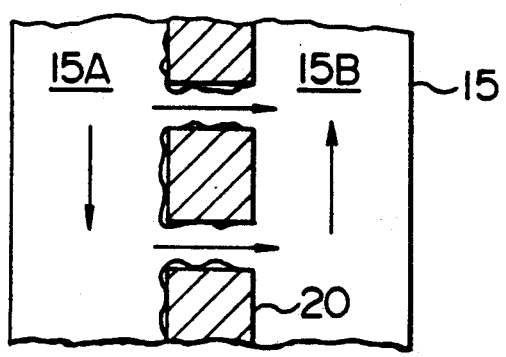
FIG. 5B is a view illustrative of filtration function of the upstream-side filter means according to the first embodiment of the invention when it is in an unfavorable condition.

In a conventional case where the upstream-side filter means of the invention are not employed, as shown in FIG. 5B, interfacial active agents or the like adhere to a surface of the membrane 20 to deteriorate the function of the membrane 20, so that the waste liquid unfavorably flows into the chamber 15B.

In this case, as shown in FIG. 6, the membrane 20 is deteriorated by the interfacial active agents or the like adhered.

However, in the case where the first filter means 2 accommodating the filter element precoated with the active silica 2f is used, the membrane 20 in the downstream-side filter means can not be deteriorated in a long time use.

Figure 7:
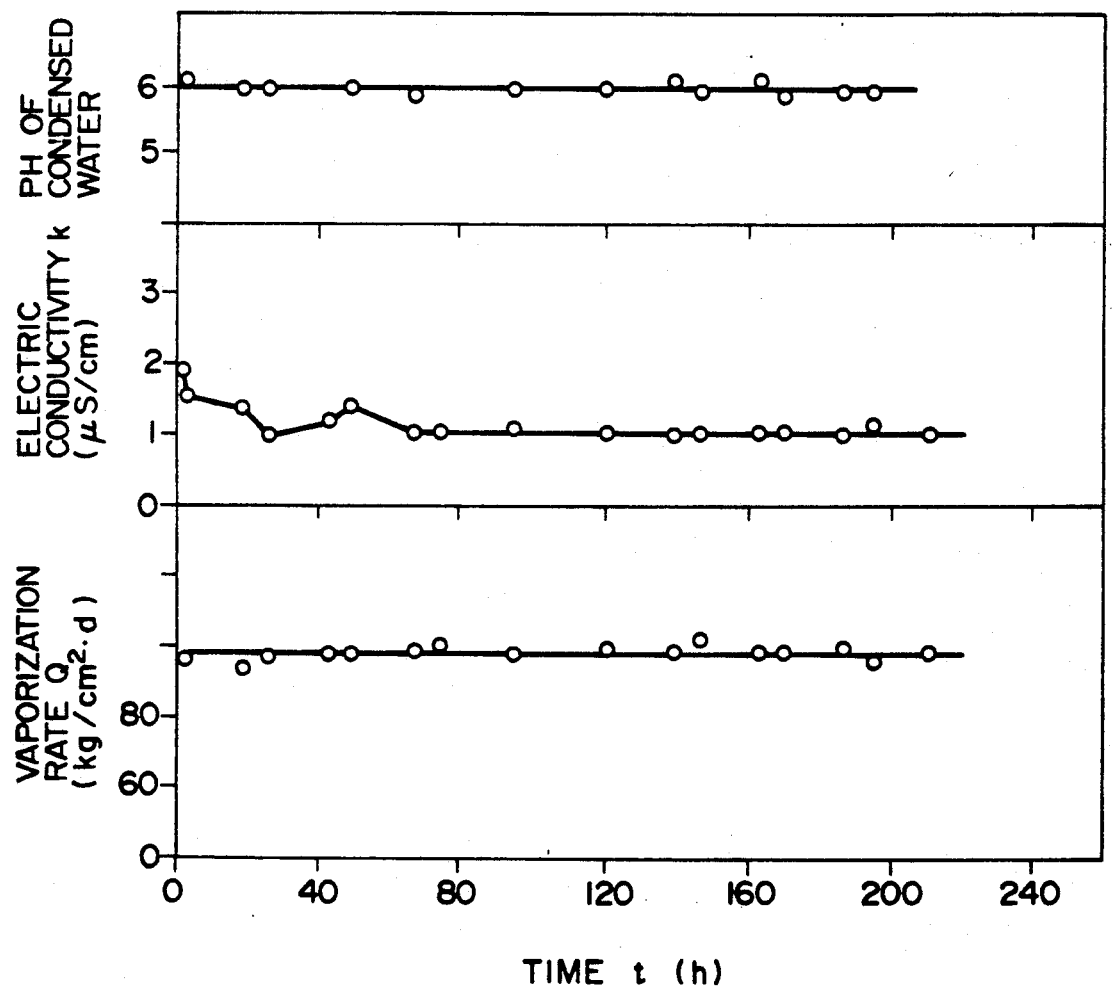
FIG. 7 is a graph illustrative of filtration function of the upstream-side and downstream-side filter means according to the first embodiment of the invention.

Also, FIG. 7 illustrates relationship among the vaporization rate and electric conductivity and pH of condensed water in the downstream-side filter means of the radioactive waste liquid disposal apparatus according to the present invention.

In FIG. 1, the waste liquid concentrated in the first circulation flow pass is discharged from the heating tank 18 by the pump 11 attached to the lower end portion of the heating tank, and then flows into the concentrated waste liquid storage tank 6 and stored therein.

The concentrated waste liquid thus stored is delivered into the solidification equipment 7 by the pump 14 and solidified therein.

Also, the recycling water obtained in the second circulation flow pass is delivered into the recycling water tank 8 by means of the pump 10 via the valve 4b and stored therein.

In the above-described embodiment, the waste liquid discharged from the waste liquid container 1 is filtrated by the first upstream-side filter means 2 and the first downstream-side filter means 4 so as to obtain the recycling water. However, when the waste liquid discharged from the waste liquid container 1 can not be filtered in the upstream-side filter means and the first downstream-side filter means in its capacity, if other flow passes are used by selectively opening/closing the control valves, the waste liquid can also be filtrated by the second upstream-side filter means 3 connected to the first upstream-side filter means 2 in parallel relation and by the second downstream-side filter means 5 connected to the first downstream-side filter means 4 in parallel relation, thereby obtaining recycling water.

Figure 2:
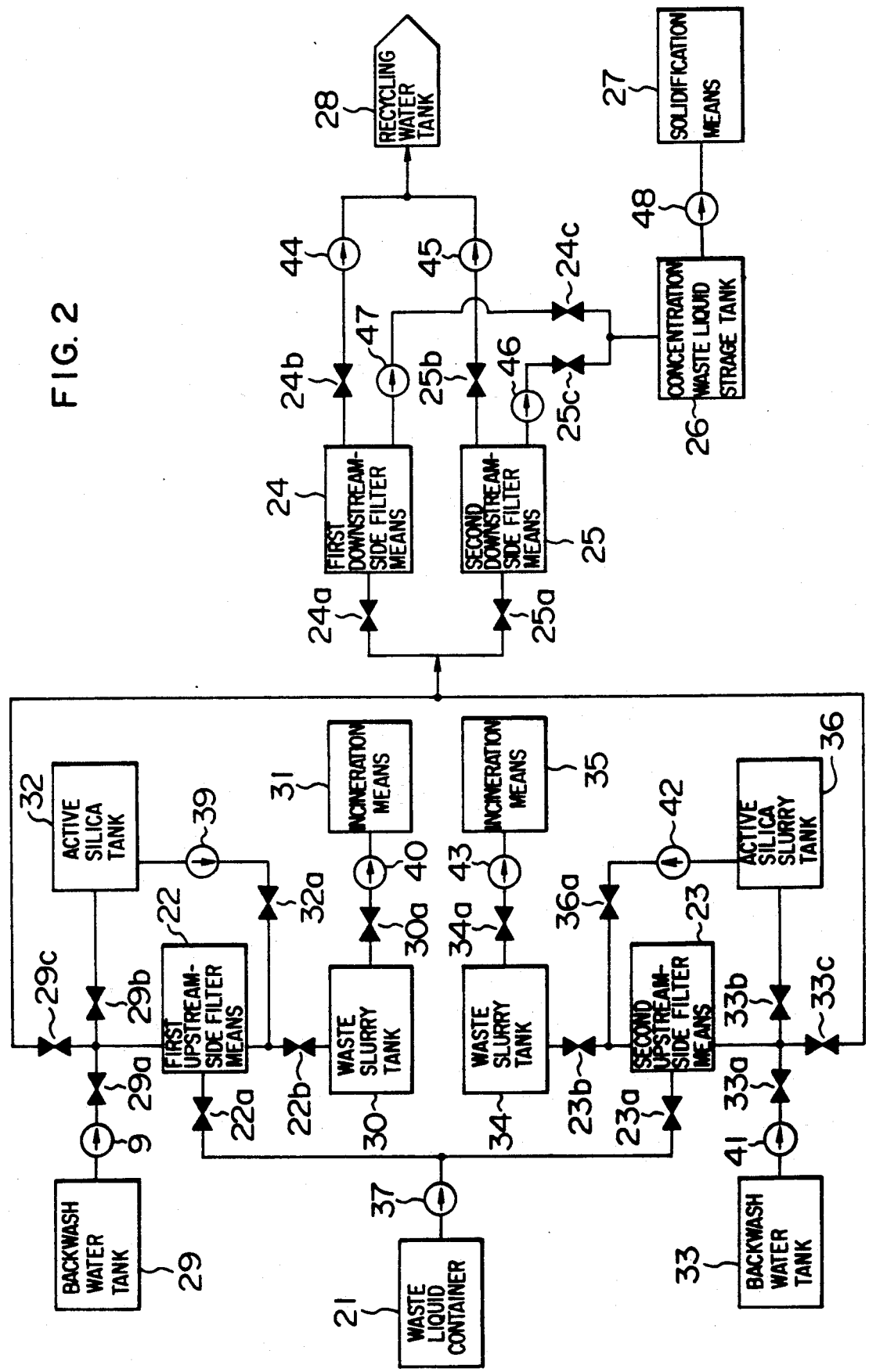
FIG. 2 is a flow chart of a second embodiment according to the invention.

FIG. 2 shows a second embodiment of a radioactive waste liquid treatment apparatus according to the present invention.

In the same manner as the first embodiment, the second embodiment comprises an upstream-side filtering system and a downstream-side filtering system. This downstream-side filtering system is identical with that of the first embodiment. Also, activated carbon may be used for filter elements of a first upstream-side filter means as substitute for active silica.

The downstream-side filtering system is also provided with a recycling water tank 28 and a concentrated waste liquid storage tank 26, to which storage tank a solidification means 27 is attached.

In the upstream-side filtering system of the second embodiment, first and second filter means 22, 23 connected in parallel to each other, which have the same filtration structure as those of the first embodiment, are provided with a backwash means including backwash water tanks 29, 33 and waste slurry tanks 30, 34, respectively.

The respective backwash water tanks 29, 33 are communicated with the first and second upstream-side filter means 22, 23 via pumps 9, 41 and control valves 29a, 33a, whereas the respective waste slurry tanks 30, 34 are communicated with the first and second upstream-side filter means 22, 23 through control valves 22b, 23b.

Figure 3B:
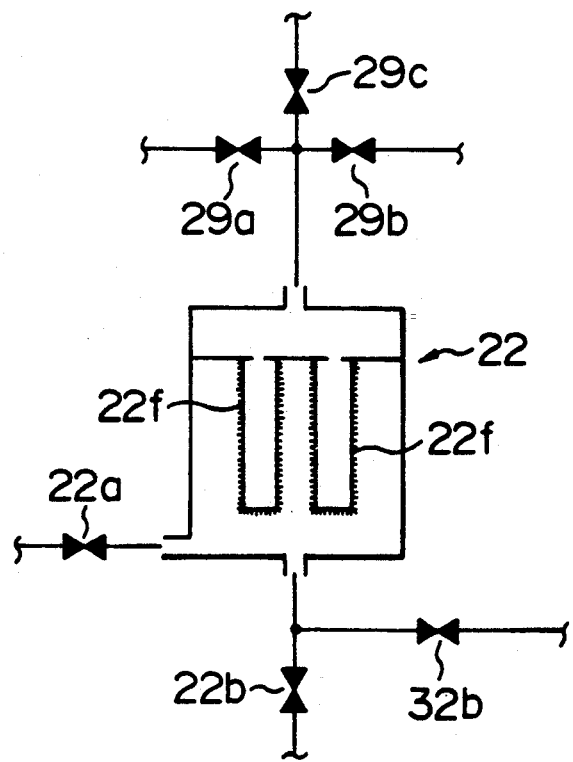
FIG. 3B is a schematic view showing an upstream-side filter means according to the second embodiment of the invention.

Referring to FIG. 3B, these backwash means have such function that when active silica precoated on filter elements in the upstream-side filter means 22 is deteriorated after long use, backwash water fed out of the backwash water tank 29 by means of the pump 9 and flowing into the upstream-side filter means via the control valve 29a serves to separate the active silica from the filter elements so that the active silica will be washed away with the backwash water into the waste slurry tank 30 through the control valve 22b.

The first and second upstream-side filter means 22, 23 further include slurry tanks 32, 36 containing active silica, respectively, and these slurry tanks 32, 36 are communicated with the first and second upstream-side filter means 22, 23 via pumps 39, 42 and control valves 32a, 36a, respectively.

The active silica in the slurry tank 32 is supplied into the first upstream-side filter means 22 through the control valve 32a by means of the pump 39, and is adhered on the filter elements, while an excess of active silica is returned into the slurry tank 32 via the control valve 29b. The second filter means 23 is likewise equipped.

Besides, the deteriorated active silica in the waste slurry tanks 30, 34 is delivered into active silica incineration equipments 31, 35 through control valves 30a, 34a by means of pumps 40, 43, respectively, so as to be incinerated therein. The incineration means are conventional ones which can incinerate several kinds of flammable solids.

In the same manner as the first embodiment, waste liquid discharged from a waste liquid container 21 can be fed into the first upstream-side filter means 22 or the second upstream-side filter means 23 or both the upstream-side filter means by selectively opening/closing control valves 22a, 23a in the second embodiment.

The waste slurry tanks 30, 34 are respectively communicated with the active silica incineration equipments 31, 35 via the pumps 40, 43 and the valve 30a, 34a.

According to the present invention, removal of interfacial active agents, oil and solid matter or the like is performed in the upstream-side filter means employing active silica, so that there can be maintained favorable filtration conditions of the downstream-side filter means, which may be deteriorated when interfacial active agents, oil and solid matter or the like are attached to the vapor permeable membrane provided within this filter means. As a result, the amount of secondary wastes can be reduced. Moreover, active silica can be incinerated after use, and its volume after incineration can be 1/40, drastically decreasing the amount of secondary wastes. Furthermore, the backwash means serves to prevent the operators from being exposed to radioactive rays.

What is claimed is:

1. A radioactive waste liquid treatment apparatus comprising an upstream-side filter means having an inlet for radioactive waste liquid, and a downstream-side filter means communicating with said upstream-side filter means and having an outlet for filtrated liquid, said upstream-side filter means including first filter member installed therein having active silica for removal of interfacial active agents and oil, said downstream-side filter means including second filter member installed therein, said second filter member having a vapor permeable membrane.

2. A radioactive waste treatment liquid apparatus according to claim 1, wherein said vapor permeable membrane defines two spaces within said downstream-side filter means, one of the spaces constituting a first circulation flow pass for flowing said radioactive waste liquid, and the other of the spaces constituting a second circulation flow pass for flowing cooling water.

3. A radioactive waste treatment liquid apparatus according to claim 1, wherein said upstream-side filter means comprises first and second filter members connected in parallel between a water liquid source and said downstream-side filter means.

4. A radioactive waste treatment liquid apparatus according to claim 3, wherein each of said first and second filter members are operatively communicated with a backwash means, an active silica supply means, a waste slurry means and incineration means for used active silica.

5. A radioactive waste liquid treatment apparatus comprising an upstream-side filter means having an inlet for radioactive waste liquid, and a downstream-side filter means communicating with said upstream-side filter means and having an outlet for filtrated liquid, said upstream-side filter means including first filter member installed therein for removal of interfacial active agents and oil, said downstream-side filter means including second filter member installed therein, said second filter member having a vapor permeable membrane, and backwash means for backwashing said first filter member of said upstream-side filter member.

6. A radioactive waste liquid treatment apparatus according to claim 5, wherein said first filter member include activated carbon.

7. A radioactive waste liquid treatment apparatus according to claim 5, wherein said first filter member include active silica.

8. A radioactive waste treatment liquid apparatus according to claim 5, wherein said first filter member is coating with active silica.

9. A radioactive waste liquid treatment apparatus comprising an upstream-side filter means having an inlet for radioactive waste liquid, and a downstream-side filter unit communicating with said upstream-side filter means and having an outlet for filtrated liquid, said upstream-side filter means including first filter member installed therein having active silica for removal of interfacial active agents and oil, said downstream-side filter member including second filter member installed therein, said second filter member having a vapor permeable membrane, and incineration means for incinerating active silica after use in said upstream-side filter means.

10. A radioactive waste liquid treatment apparatus comprising an upstream-side filter means with active silica configured for removing interfacial active agents and oil from radioactive waste liquid, a downstream-side filter means with a vapor permeated membrane communicating with said upstream-side filter means and having an outlet for filtrated liquid, and means for incinerating the active silica after use thereof in said upstream-side filter means.

11. A radioactive waste treatment liquid apparatus according to claim 10, wherein said vapor permeable membrane defines two spaces within said downstream-side filter means, one of the spaces constituting a first circulation flow pass for flowing said radioactive waste liquid, and the other of the spaces constituting a second circulation flow pass for flowing cooling water.

12. A radioactive waste treatment liquid apparatus according to claim 10, wherein said upstream-side filter means comprises first and second filter members connected in parallel between a waste liquid source and said downstream-side filter means.

13. A radioactive liquid waste treatment apparatus comprising an upstream-side filter means having a filter member provided with active silica for removing interfacial active agents and oil from radioactive waste liquid, and a downstream-side filter means with a vapor permeable member communicating with said upstream-side filter means and having an outlet for filtrated liquid.

14. A radioactive waste treatment liquid apparatus according to claim 13, wherein said vapor permeable membrane defines two spaces within said downstream-side filter means, one of the spaces constituting a first circulation flow pass for flowing said radioactive waste liquid, and the other of the spaces constituting a second circulation flow pass for flowing cooling water.

15. A radioactive waste liquid treatment apparatus comprising an upstream-side filter means with first and second filter members connected in parallel for removing interfacial active agents and oil from radioactive waste liquid, and a downstream-side filter means with a vapor permeable membrane communicating with said upstream-side filter means and having an outlet for filtrated liquid, wherein said first and second filter members are connected between a waste liquid source and said downstream-side filter means.

* * * * *

UNITED STATES PATENT AND TRADEMARK OFFICE
CERTIFICATE OF CORRECTION

PATENT NO. : 5,158,674
DATED : October 27, 1992
INVENTOR(S) : Kikuchi, et al.

It is certified that error appears in the above-identified patent and that said Letters Patent is hereby corrected as shown below:

On the title page, Item [73], insert --Assignee: Hitachi, Ltd., Tokyo, Japan--.

Signed and Sealed this

Twelfth Day of October, 1993

*Attest:*

BRUCE LEHMAN

*Attesting Officer*     *Commissioner of Patents and Trademarks*